(12) United States Patent
Ahn et al.

(10) Patent No.: US 12,120,744 B2
(45) Date of Patent: *Oct. 15, 2024

(54) WIRELESS COMMUNICATION TERMINAL AND WIRELESS COMMUNICATION METHOD FOR MULTIUSER EDCA OPERATION

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,702

(22) Filed: Jun. 21, 2023

(65) Prior Publication Data
US 2023/0337283 A1    Oct. 19, 2023

Related U.S. Application Data

(63) Continuation of application No. 17/185,940, filed on Feb. 25, 2021, now Pat. No. 11,716,759, which is a
(Continued)

(30) Foreign Application Priority Data

Sep. 23, 2016  (KR) .......................... 10-2016-0122488
Feb. 16, 2017  (KR) .......................... 10-2017-0020966

(51) Int. Cl.
*H04W 74/0816* (2024.01)
*H04B 7/0452* (2017.01)
(Continued)

(52) U.S. Cl.
CPC ...... *H04W 74/0816* (2013.01); *H04B 7/0452* (2013.01); *H04W 74/002* (2013.01); *H04W 84/12* (2013.01); *H04W 74/085* (2013.01)

(58) Field of Classification Search
CPC .......... H04W 74/0816; H04W 74/002; H04W 84/12; H04W 74/085; H04B 7/0452
See application file for complete search history.

(56) References Cited

U.S. PATENT DOCUMENTS 10,623,133 B2    4/2020  Park et al.
10,700,989 B2    6/2020  Baron et al.
(Continued)

FOREIGN PATENT DOCUMENTS

CN    102859895    1/2013
CN    103379554    10/2013
(Continued)

OTHER PUBLICATIONS

International Search Report for PCT/KR2017/010529 mailed on Dec. 28, 2017 and its English translation from WIPO (now published as WO 2018/056771).
(Continued)

*Primary Examiner* — Sharmin Chowdhury
(74) *Attorney, Agent, or Firm* — Womble Bond Dickinson (US) LLP

(57) ABSTRACT

The present invention relates to a wireless communication terminal and a wireless communication method for a multi-user EDCA operation, and more particularly, to a wireless communication terminal and a wireless communication method for performing a combination of a legacy EDCA
(Continued)

operation and a multi-user EDCA operation. To this end, provided are a wireless communication terminal including: a communication unit; and a processor configured to control transmission and reception of a wireless signal through the communication unit, wherein the processor updates enhanced distributed channel access (EDCA) parameters for channel access, the EDCA parameters being updated based on an EDCA parameter set selected from a first EDCA parameter set and a second EDCA parameter set, and performs channel access based on the updated EDCA parameters and a wireless communication method using the same.

12 Claims, 9 Drawing Sheets

Related U.S. Application Data continuation of application No. 16/361,283, filed on Mar. 22, 2019, now Pat. No. 10,966,251, which is a continuation of application No. PCT/KR2017/010529, filed on Sep. 25, 2017.

(51) Int. Cl.
*H04W 74/00* (2009.01)
*H04W 84/12* (2009.01)
*H04W 74/0833* (2024.01)

(56) References Cited

U.S. PATENT DOCUMENTS

| | | |
|---|---|---|
| 11,116,035 B2 | 9/2021 | Ahn et al. |
| 11,516,879 B2 | 11/2022 | Ahn et al. |
| 11,523,464 B2 | 12/2022 | Ahn et al. |
| 11,825,558 B2 | 11/2023 | Ahn et al. |
| 2010/0081393 A1 | 4/2010 | Huang |
| 2010/0150116 A1 | 6/2010 | Ji et al. |
| 2015/0036572 A1 | 2/2015 | Seok |
| 2015/0063105 A1 | 3/2015 | Liu et al. |
| 2015/0124689 A1 | 5/2015 | Merlin et al. |
| 2015/0245382 A1 | 8/2015 | Park et al. |
| 2015/0319609 A1 | 11/2015 | Hi et al. |
| 2016/0057657 A1 | 2/2016 | Seok |
| 2016/0066257 A1 | 3/2016 | Liu et al. |
| 2016/0128101 A1 | 5/2016 | Park et al. |
| 2016/0157266 A1 | 6/2016 | Wang et al. |
| 2016/0198500 A1 | 7/2016 | Merlin et al. |
| 2017/0202023 A1 | 7/2017 | Zhou et al. |
| 2017/0245261 A1 | 8/2017 | Cariou et al. |
| 2017/0325264 A1 | 11/2017 | Cherian et al. |
| 2018/0020428 A1* | 1/2018 | Madhavan ............ H04W 72/51 |
| 2019/0223219 A1 | 7/2019 | Ahn et al. |
| 2019/0313453 A1 | 10/2019 | Baron et al. |
| 2021/0185731 A1 | 6/2021 | Ahn et al. |

FOREIGN PATENT DOCUMENTS

| | | |
|---|---|---|
| CN | 104066091 | 9/2014 |
| CN | 105142207 | 12/2015 |
| CN | 105830506 | 8/2016 |
| EP | 3 270 646 | 1/2018 |
| EP | 3 412 107 | 12/2018 |
| JP | 2015-50650 | 3/2015 |
| JP | 2018-509024 | 3/2018 |
| KR | 10-2014-0116909 | 11/2014 |
| KR | 10-1512731 | 4/2015 |
| KR | 10-2015-0073165 | 6/2015 |
| KR | 10-2016-0022790 | 3/2016 |
| KR | 10-2016-0045023 | 4/2016 |
| WO | 2016/069399 | 5/2016 |
| WO | 2016/112146 | 7/2016 |
| WO | 2018/016784 | 1/2018 |
| WO | 2018/056771 | 3/2024 |

OTHER PUBLICATIONS

Written Opinion of the International Searching Authority for PCT/KR2017/010529 mailed on Dec. 28, 2017 and its English translation by Google Translate (now published as WO 2018/056771).
Ahn, Jin Soo et al., "MU Mode EDCA Control", doc.: IEEE 802.11-16/1220r1, Sep. 14, 2015, Slides 1-10. See slides 2, 7, 9.
International Preliminary Report on Patentability (Chapter I) for PCT/KR2017/010529 issued on Mar. 26, 2019 and its English translation from WIPO (now published as WO 2018/056771).
Laurent Cariou et al. "2 sets of EDCA parameters", Doc.: IEEE 802.11-16/0998r0, Jul. 25, 2016, slides 1-20.
Laurent Cariou et al. "2 sets of EDCA parameters", Doc.: IEEE 802.11-16/0998r1, Jul. 25, 2016, slides 1-33.
Laurent Cariou et al. "2 sets of EDCA parameters", Doc.: IEEE 802.11-16/0998r2, Sep. 12, 2016, slides 1-32.
Laurent Cariou et al. "2 sets of EDCA parameters", Doc.: IEEE 802.11-16/0998r3, Sep. 12, 2016, slides 1-32.
Office Action dated Dec. 16, 2019 for Japanese Patent Application No. 2019-534619 and its English translation provided by the Applicant's foreign counsel.
Laurent Cariou et al. "2 Sets of EDCA Parameters", IEEE 802.11-16/0998r0, IEEE, Jul. 2016, Search Date Dec. 5, 2019, Internet URL: https://mentor.ieee.org/802.11/dcn/16/11-16-0998-00-00ax-rules-for-2-edcaparameters.Pptx>. Slides 1-21.
Extended European Search Report dated May 12, 2020 for European Patent Application No. 17849113.0.
Office Action dated Jun. 23, 2020 for U.S. Appl. No. 16/294,883.
Laurent Cariou et al., "Proposed spec text for MU EDCA parameters", Wireless LANS IEEE P802.11-16/1180r0, Sep. 2016, pp. 1-8.
Office Action dated Jun. 29, 2020 for Japanese Patent Application No. 2019-534619 and its English translation provided by Applicant's foreign counsel.
Laurent Cariou et al., "Proposed spec text for MU EDCA parameters", Resolution for CID 9058 and 90751, IEEE P802.11, Wireless LANs, Sep. 1, 2016, pp. 1-7.
Notice of Allowance dated Nov. 13, 2020 for U.S. Appl. No. 16/361,283 (now published as US 2019/0223219).
Office Action dated May 14, 2020 for U.S. Appl. No. 16/361,283 (now published as US 2019/0223219).
Office Action dated May 10, 2023 for U.S. Appl. No. 17/979,767.
Hearing Notice dated Jan. 24, 2023 for Indian Patent Application No. 201927007972.
Notice of Allowance dated Mar. 10, 2023 for Chinese Patent Application No. 201780058494.0 and its English translation provided by Applicant's foreign counsel.
Notice of Allowance dated Jul. 19, 2022 for Korean Patent Application No. 10-2022-7018628 and its English translation provided by Applicant's foreign counsel.
Notice of Allowance dated Jul. 25, 2022 for Korean Patent Application No. 10-2022-7018630 and its English translation provided by Applicant's foreign counsel.
Notice of Allowance dated Sep. 9, 2022 for U.S. Appl. No. 17/383,475.
Notice of Allowance dated Sep. 21, 2022 for U.S. Appl. No. 17/383,479.
Notice of Allowance dated Oct. 13, 2022 for U.S. Appl. No. 17/185,959.
Office Action dated Oct. 21, 2022 for Korean Patent Application No. 10-2022-7030653 and its English translation provided by Applicant's foreign counsel.
Office Action dated Oct. 25, 2022 for Chinese Patent Application No. 201780058494.0 and its English translation provided by Applicant's foreign counsel.
Notice of Allowance dated Oct. 28, 2022 for Chinese Patent Application No. 201780054732.0 and its English translation provided by Applicant's foreign counsel.
Office Action dated Nov. 22, 2022 for Korean Patent Application No. 10-2022-7032282 and its English translation provided by Applicant's foreign counsel.

(56) References Cited

OTHER PUBLICATIONS

Office Action dated Sep. 22, 2021 for Korean Patent Application No. 10-2019-7006093 and its English translation provided by the Applicant's foreign counsel.
Office Action dated Mar. 24, 2022 for Chinese Patent Application No. 201780058494.0 and its English translation provided by Applicant's foreign counsel.
Office Action dated Mar. 25, 2022 for Chinese Patent Application No. 201780054732.0 and its English translation provided by Applicant's foreign counsel.
Trial and Appeal Decision dated Apr. 25, 2022 for Japanese Patent Application No. 2019-534619 and its English translation provided by Applicant's foreign counsel.
Office Action dated Oct. 4, 2021 for Japanese Patent Application No. 2019-534619 and its English translation provided by the Applicant's foreign counsel.
Notice of Allowance dated Jun. 17, 2022 for Korean Patent Application No. 10-2021-7036247 and its English translation provided by Applicant's foreign counsel.
Extended European Search Report dated May 13, 2022 for European Patent Application No. 22152570.2.
Pre-Appeal Examination Report dated Jan. 4, 2021 for Japanese Patent Application No. 2019-534619 and its English translation provided by Applicant's foreign counsel.
Office Action dated Mar. 22, 2021 for Korean Patent Application No. 10-2019-7006093 and its English translation provided by the Applicant's foreign counsel.
Office Action dated Dec. 2, 2021 for Korean Patent Application No. 10-2021-7036247 and its English translation provided by Applicant's foreign counsel.
Notice of Allowance dated Dec. 2, 2021 for Korean Patent Application No. 10-2021-7036248 and its English translation provided by Applicant's foreign counsel.
Notice of Allowance dated Mar. 14, 2023 for U.S. Appl. No. 17/185,940 (now published as US 2021/0185731).
Office Action dated Sep. 28, 2022 for U.S. Appl. No. 17/185,940 (now published as US 2021/0185731).
Nullity Action dated Jan. 12, 2024 for European Patent Application No. 3 512 289 and its English translation provided by Applicant's foreign counsel.
Resolution for CID 9058 and 90750, "Proposed spec text for MU EDCA parameters", Sep. 2016, pp. 1-8.
IEEE 802.11-2012: "Part 11: Wireless LAN Medium Access Control (MAC) and Physical Layer (PHY) Specifications", Mar. 29, 2012, pp. 1-2695.
Laurent Cariou et al.: "2 sets of EDCA parameters", Doc.: IEEE 802.11-16/0998r1, Jul. 2016, slides 1-33.
Statement of Defense dated Jan. 12, 2024 for European Patent Application No. 3 512 289 and its English translation provided by Applicant's foreign counsel.
U.S. Appl. No. 62/352,564, filed Jun. 21, 2016 (priority of U.S. Pat. No. 10,623,133).
Notice of Hearing dated Nov. 30, 2023 for Indian Patent Application No. 201927012269.
Notice of Allowance dated Dec. 15, 2023 for European Patent Application No. 22 152 570.2.
Jayh Park et al.: "UL MU Transmission Rules—EDCA Backoff", doc.: IEEE 802.11-16/0880r2, Jul. 25, 2016, slides 1-21.
Notice of Allowance dated May 30, 2024 for Korean Patent Application No. 10-2023-7039548 and its English translation provided by Applicant's foreign counsel.
Office Action dated May 31, 2024 for U.S. Appl. No. 18/384,678.
Notice of Allowance dated Jun. 21, 2024 for Korean Patent Application No. 10-2024-7014397 and its English translation provided by Applicant's foreign counsel.
Office Action dated Jun. 29, 2024 for Chinese Patent Application No. 202211378337.7 and its English translation provided by Applicant's foreign counsel.
Rebuttal in the nullity action dated Jun. 14, 2024 for European Patent Application No. 3 512 289 and its English translation provided by Applicant's foreign counsel.
U.S. Appl. No. 62/290,184, filed Feb. 2, 2016.
Office Action dated Jul. 31, 2024 for Chinese Patent Application No. 202211380666.5 and its English translation provided by Applicant's foreign counsel.
Office Action dated Jul. 31, 2024 for Chinese Patent Application No. 202211378336.2 and its English translation provided by Applicant's foreign counsel.
Jayh Park et al.: "Operating Mode Indication—Part II Tx OMI (TOMI)", doc.: IEEE 802.11-16/0882r0, Jul. 5, 2016, pp. 1-5.
Laurent Cariou: "CR for MU EDCA parameters—27.2.3", doc.: IEEE 802.11-17/204r1, Jan. 16, 2017, pp. 1-18.

\* cited by examiner

WIRELESS COMMUNICATION TERMINAL AND WIRELESS COMMUNICATION METHOD FOR MULTIUSER EDCA OPERATION

CROSS-REFERENCE TO RELATED APPLICATIONS

This application is a continuation of U.S. patent application Ser. No. 17/185,940 filed on Feb. 25, 2021, which is a continuation of U.S. patent application Ser. No. 16/361,283 filed on Mar. 22, 2019, now issued as U.S. Pat. No. 10,966,251 on Mar. 30, 2021, which is a continuation of International Patent Application No. PCT/KR2017/010529 filed on Sep. 25, 2017, which claims the priority to Korean Patent Application No. 10-2016-0122488 filed in the Korean Intellectual Property Office on Sep. 23, 2016 and Korean Patent Application No. 10-2017-0020966 filed in the Korean Intellectual Property Office on Feb. 16, 2017, the entire contents of which are incorporated herein by reference.

TECHNICAL FIELD

The present invention relates to a wireless communication terminal and a wireless communication method for a multi-user EDCA operation, and more particularly, to a wireless communication terminal and a wireless communication method for performing a combination of a legacy EDCA operation and a multi-user EDCA operation.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to manage and control parameters for a multi-user EDCA operation in addition to a legacy EDCA operation.

Technical Solution

In order to achieve the objects, the present invention provides a wireless communication method and a wireless communication terminal as below.

First, an exemplary embodiment of the present invention provides a wireless communication terminal, including: a communication unit; and a processor configured to control transmission and reception of a wireless signal through the communication unit, wherein the processor is updates enhanced distributed channel access (EDCA) parameters for channel access, the EDCA parameters being updated based on an EDCA parameter set selected from a first EDCA parameter set and a second EDCA parameter set, and performs channel access based on the updated EDCA parameters.

In this case, the second EDCA parameter set may be a multi-user (MU) EDCA parameter set, and when the EDCA parameters are updated based on the MU EDCA parameter set, the processor may set an MU EDCA timer indicating a duration of performing channel access using parameters updated based on the MU EDCA parameter set.

According to an embodiment of the present invention, when the terminal does not participate in an uplink multi-user (UL-MU) transmission, the processor may transmit a frame containing an operating mode indication (OMI) information in which a UL-MU disable subfield indicates a suspension of a UL-MU operation, and when an immediate acknowledgment for the frame containing the OMI information is received from an OMI responder, the processor may set the MU EDCA timer to zero.

Further, when the immediate acknowledgment for the frame containing the OMI information is received from the OMI responder, the processor may set MU EDCA timers of all access categories to zero.

According to an embodiment, when the MU EDCA timer reaches zero, the processor may update the EDCA parameters based on the first EDCA parameter set most recently received from a base wireless communication terminal to which the terminal is associated.

According to another embodiment, when the MU EDCA timer reaches zero, the processor may update the EDCA parameters based on a predetermined default EDCA parameter set if the first EDCA parameter set has not been received from a base wireless communication terminal to which the terminal is associated.

Further, the MU EDCA timer may be set to a value of an MU EDCA timer subfield of the MU EDCA parameter set most recently received from a base wireless communication terminal to which the terminal is associated.

Further, at least one parameter of the second EDCA parameter set may have a value greater than a corresponding parameter of the first EDCA parameter set.

Further, the channel access may be performed based on a backoff procedure using a backoff timer obtained within a contention window of a corresponding access category, and the EDCA parameters may include a contention window minimum value and a contention window maximum value for setting the contention window.

Further, the first EDCA parameter set and the second EDCA parameter set may be received via at least one of a beacon, a probe response, and an association response transmitted by a base wireless communication terminal to which the terminal is associated.

In addition, another exemplary embodiment of the present invention provides a wireless communication method of a wireless communication terminal, including: updating enhanced distributed channel access (EDCA) parameters for channel access, wherein the EDCA parameters are updated based on an EDCA parameter set selected from a first EDCA parameter set and a second EDCA parameter set; and performing channel access based on the updated EDCA parameters.

In this case, the second EDCA parameter set may be a multi-user (MU) EDCA parameter set, and when the EDCA parameters are updated based on the MU EDCA parameter set, the method further includes: setting an MU EDCA timer indicating a duration of performing channel access using parameters updated based on the MU EDCA parameter set.

According to an embodiment of the present invention, when the terminal does not participate in an uplink multi-user (UL-MU) transmission, the method further includes: transmitting a frame containing an operating mode indication (OMI) information in which a UL-MU disable subfield indicates a suspension of a UL-MU operation, and when an immediate acknowledgment for the frame containing the OMI information is received from an OMI responder, the method further includes: setting the MU EDCA timer to zero.

Further, when the immediate acknowledgment for the frame containing the OMI information is received from the OMI responder, the setting the MU EDCA timer to zero includes setting MU EDCA timers of all access categories to zero.

According to an embodiment, when the MU EDCA timer reaches zero, the updating step includes updating the EDCA parameters based on the first EDCA parameter set most recently received from a base wireless communication terminal to which the terminal is associated.

According to another embodiment, when the MU EDCA timer reaches zero, the updating step includes updating the EDCA parameters based on a predetermined default EDCA parameter set if the first EDCA parameter set has not been received from a base wireless communication terminal to which the terminal is associated.

Further, the MU EDCA timer may be set to a value of an MU EDCA timer subfield of the MU EDCA parameter set most recently received from a base wireless communication terminal to which the terminal is associated.

Further, at least one parameter of the second EDCA parameter set has a value greater than a corresponding parameter of the first EDCA parameter set.

Further, the channel access may be performed based on a backoff procedure using a backoff timer obtained within a contention window of a corresponding access category, and the EDCA parameters may include a contention window minimum value and a contention window maximum value for setting the contention window.

Further, the first EDCA parameter set and the second EDCA parameter set may be received via at least one of a beacon, a probe response, and an association response transmitted by a base wireless communication terminal to which the terminal is associated.

Advantageous Effects

According to an embodiment of the present invention, switching between the legacy EDCA operation and the multi-user EDCA operation can be efficiently managed.

According to an embodiment of the present invention, it is possible to increase the total resource utilization rate in the contention-based channel access system and improve the performance of the wireless LAN system.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2016-0122488 and 10-2017-0020966 filed in the Korean Intellectual Property Office and the embodiments and mentioned items described in the respective application, which forms the basis of the priority, shall be included in the Detailed Description of the present application.

Figure 1:
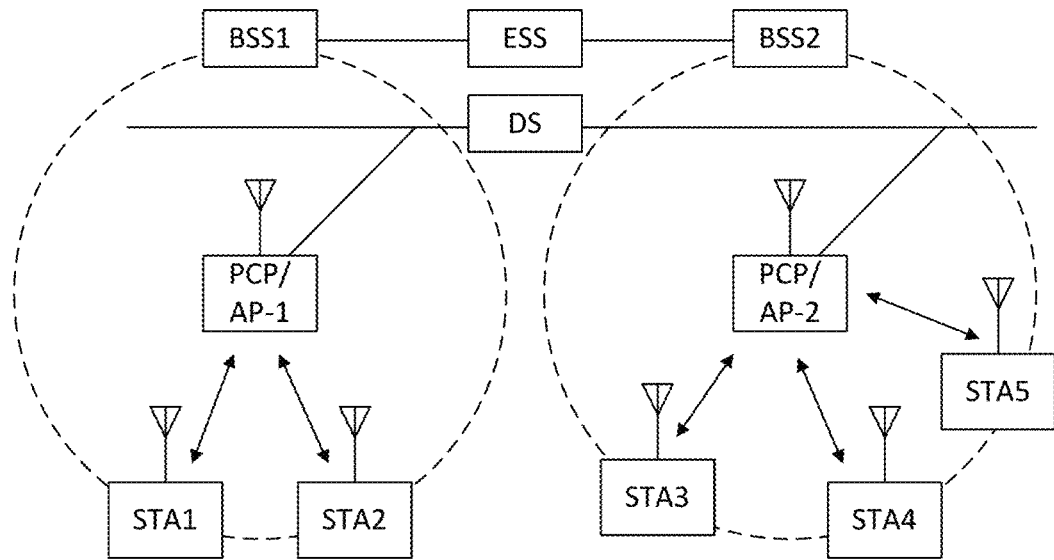
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
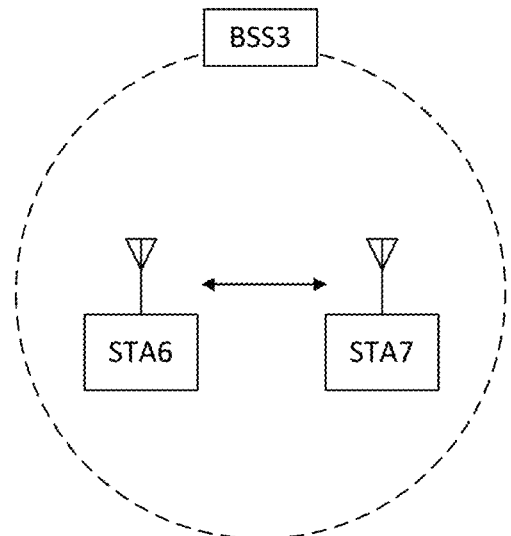
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
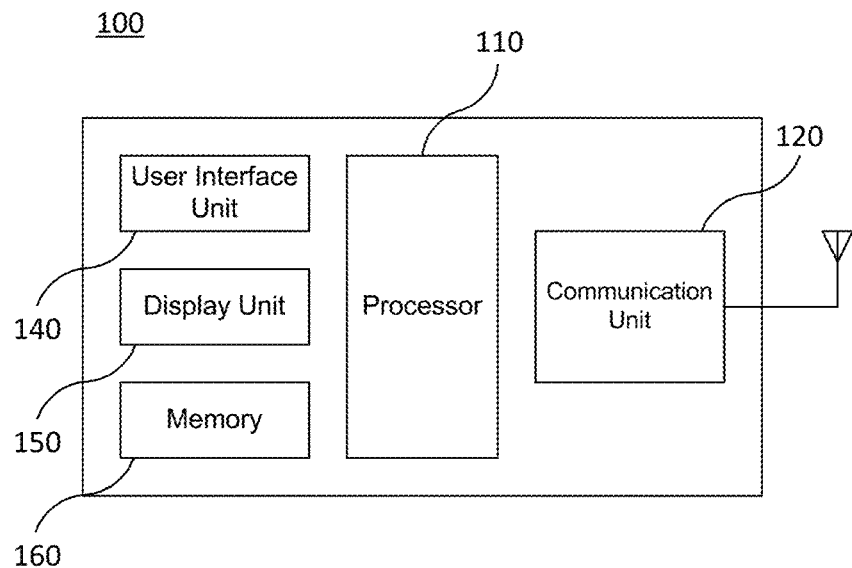
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
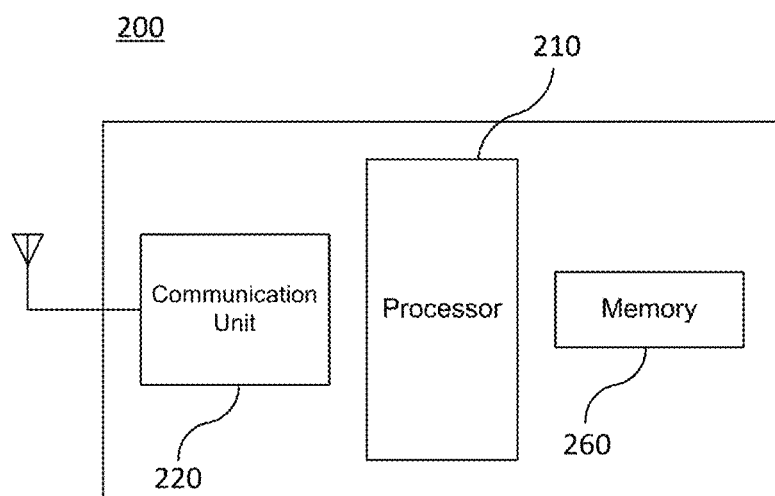
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
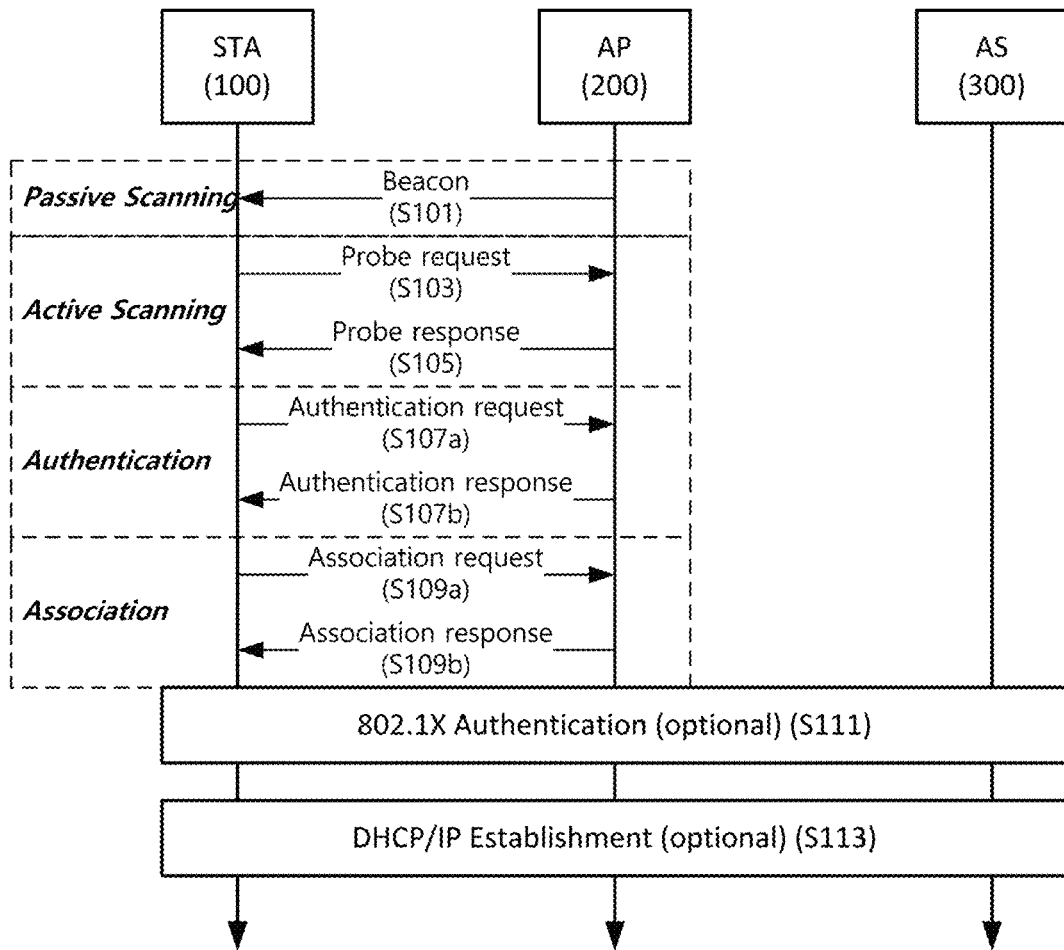
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of a BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
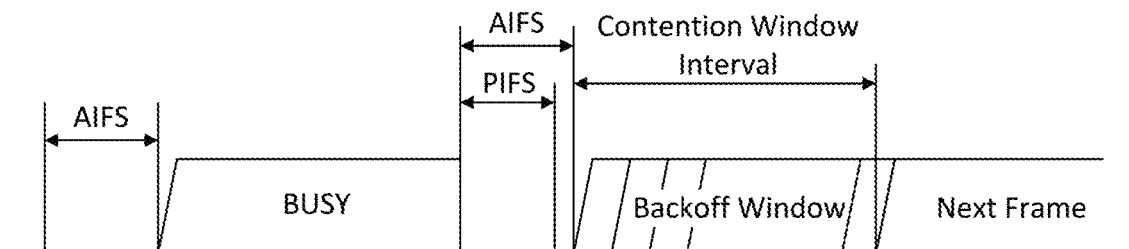
FIG. 6 illustrates a carrier sense multiple access (CSMA)/collision avoidance (CA) method used in wireless LAN communication.

FIG. 6 illustrates a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the transmission on the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number, that is, a backoff counter determined by the corresponding terminal during an interval of an idle state of the channel and a terminal that completely exhausts the slot time(s) attempts to transmit on the corresponding channel. As such, an interval in which each terminal performs the backoff procedure is referred to as a contention window interval.

When a specific terminal successfully accesses the channel, the corresponding terminal may transmit data through the channel. However, when the terminal which attempts the transmission collides with another terminal, the terminals which collide with each other are assigned with new random numbers (i.e. backoff counters), respectively to perform the backoff procedure again. According to an embodiment, a random number newly assigned to each terminal may be decided within a range (2*CW) which is twice larger than a range (a contention window, CW) of a random number which the corresponding terminal has previously used. Meanwhile, each terminal accesses the channel by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Multi-User Transmission

When using orthogonal frequency division multiple access (OFDMA) or multi-input multi-output (MIMO), a wireless communication terminal can simultaneously transmit data to one or more wireless communication terminals. Further, one or more wireless communication terminals can simultaneously transmit data to a wireless communication terminal. For example, a downlink multi-user (DL-MU) transmission in which an AP simultaneously transmits data to one or more STAs, and an uplink multi-user (UL-MU) transmission in which one or more STAs simultaneously transmit data to the AP may be performed.

In order to perform the UL-MU transmission, a resource unit to be used by each STA and the transmission start time of each STA that performs uplink transmission should be determined. According to an embodiment of the present invention, the UL-MU transmission process may be managed by the AP. The UL-MU transmission may be performed in response to a trigger frame transmitted by the AP. The trigger frame indicates a UL-MU transmission a SIFS time after the completion of the transmission of the PHY protocol data unit (PPDU) carrying the trigger frame. Further, the trigger frame delivers resource unit allocation information for the UL-MU transmission. When the AP transmits a trigger frame, one or more STAs transmit uplink data through each allocated resource unit at the time specified by the trigger frame. A UL-MU transmission in response to the trigger frame is performed by a trigger-based PPDU. After the uplink data transmission is completed, the AP transmits an ACK to STAs that have successfully transmitted uplink data. In this case, the AP may transmit a predetermined multi-STA block ACK (M-BA) as an ACK for one or more STAs.

In the non-legacy wireless LAN system, a specific number, for example, 26, 52, or 106 tones may be used as a resource unit for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

Multi-User Enhanced Distributed Channel Access (EDCA)

A wireless communication terminal using an unlicensed band as in a wireless LAN system can access a channel through a contention procedure. A terminal which has data to be transmitted does not attempt to transmit immediately but attempts to transmit after a predetermined waiting time (e.g., AIFS[AC]) designated for each access category (AC) to which each traffic belongs. If the channel is switched from a busy state to an idle state, the terminal performs a backoff procedure after the designated waiting time. For the backoff procedure, the terminal sets a random number obtained from a contention window (i.e., CW[AC]) of the corresponding access category to a backoff timer (or backoff counter). The terminal decrements the backoff timer while the channel is idle, and may perform transmission when the value of the backoff timer reaches zero. Such a designated waiting time (i.e., AIFS[AC]), a contention window (i.e., CW [AC]), a contention window minimum value (i.e., CWmin), a contention window maximum value (i.e., CWmax) for the channel access may be maintained and managed for each access category.

As described above, a UL-MU transmission can be performed in the non-legacy wireless LAN system. The AP triggers the uplink transmission of one or more STAs. In this case, the AP accesses the channel to trigger UL-MU transmission. On the other hand, each STA may access the channel separately to transmit data of the corresponding STA. If a UL-MU transmission of a STA is triggered during an individual access procedure of the corresponding STA, the STA may suspend the individual access procedure and perform the UL-MU transmission. Therefore, the STA has a high competitive advantage compared to a legacy terminal because it has the redundant transmission opportunity through the individual transmission and the UL-MU transmission for the same traffic. In addition, since the AP and the STA simultaneously compete for traffic transmission of the specific STA, the probability of a collision may increase.

In order to solve such a problem, according to the embodiment of the present invention, a separate EDCA parameter set for a STA participating in the UL-MU transmission can be used. The EDCA parameter set is a set of parameters for channel access, including AIFSN, CWmin and CWmax of the corresponding AC. The AIFSN indicates the number of slots after a SIFS included in the designated waiting time (i.e., AIFS). In the embodiment of the present invention, an EDCA parameter set used in a legacy wireless LAN system is referred to as a legacy EDCA parameter set (or a first EDCA parameter set), and a separate EDCA parameter set used for a STA participating in the UL-MU transmission in the non-legacy wireless LAN system is referred to as a multi-user (MU) EDCA parameter set (or a second EDCA parameter set). In addition, an EDCA parameter set and EDCA parameter set element may be used as terms having the same meaning. The legacy EDCA parameter set and the MU EDCA parameter set may be received via at least one of a beacon, a probe response, and an association response transmitted by the AP to which the STA is associated.

According to the embodiment of the present invention, at least one parameter of the MU EDCA parameter set may have a value greater than a corresponding parameter of the legacy EDCA parameter set. For example, a CWmax value of a particular AC in the MU EDCA parameter set may be set to be greater than a CWmax value of the same AC in the legacy parameter set. In addition, an AIFSN value of a particular AC in the MU EDCA parameter set may be set to be greater than an AIFSN value of the same AC in the legacy parameter set. By using the MU EDCA parameter set configured as above, the STA participating in the UL-MU transmission may perform individual channel access with a lower transmission probability than the conventional method.

Figures 7, 8:
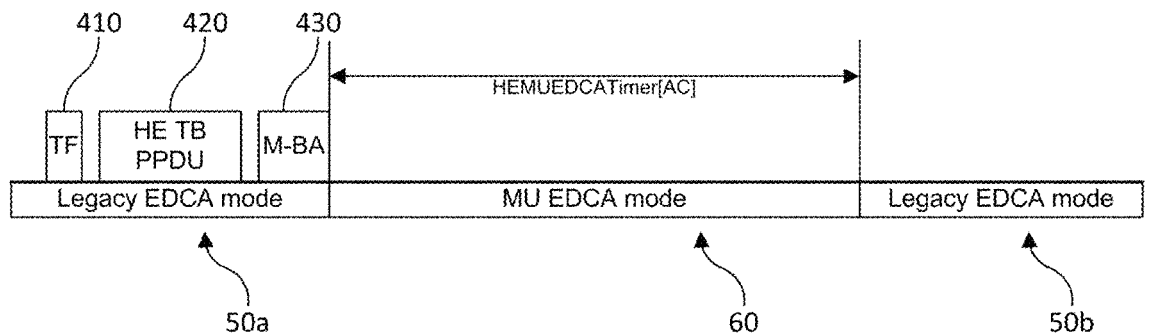
FIG. 7 illustrates a switching operation between a legacy EDCA mode and a multi-user EDCA mode according to an embodiment of the present invention.
FIG. 8 illustrates a configuration of a multi-user EDCA parameter set element according to an embodiment of the present invention.

FIG. 7 illustrates a switching operation between a legacy EDCA mode and a multi-user EDCA mode according to an embodiment of the present invention. A STA according to an embodiment of the present invention may update the EDCA parameters for channel access based on an EDCA parameter set selected from the legacy EDCA parameter set and the MU EDCA parameter set. The STA performs channel access based on the updated EDCA parameters. Thus, the STA may perform switching between a legacy EDCA mode 50a, 50b in which channel access is performed using the legacy EDCA parameter set and an MU EDCA mode 60 in which channel access is performed using the MU EDCA parameter set. In the embodiment of the present invention, switching between the legacy EDCA mode 50a, 50b and the MU EDCA mode 60 may indicate a mode switching of a particular access category.

Referring to FIG. 7, a STA that has succeeded in the UL-MU transmission may switch from the legacy EDCA mode 50a to the MU EDCA mode 60. More specifically, the STA switches from the legacy EDCA mode 50a to the MU EDCA mode 60 when the following conditions are satisfied.

First condition: The STA should receive a trigger frame 410 indicating the UL-MU transmission of the STA from the AP. That is, the STA should receive the trigger frame 410 containing a user information field indicating an AID of the corresponding STA. In this case, the trigger frame may be a basic trigger frame.

Second condition: In response to receiving the trigger frame 410, the STA should transmit a trigger-based PPDU 420 to the AP. In this case, the trigger-based PPDU 420 should contain a QoS data frame.

Third condition: The STA should receive an immediate acknowledgment 430 from the AP for the trigger-based PPDU 420. In this case, the immediate acknowledgment may indicate that the recipient transmits a response to the sender within a predetermined duration of time within the same transmission opportunity (TXOP). An M-BA may be used as an embodiment of the immediate acknowledgment 430, but the present invention is not limited thereto.

If the above three conditions are satisfied, the STA may switch the mode of the corresponding access category from the legacy EDCA mode 50a to the MU EDCA mode 60. When switched to the MU EDCA mode 60, the STA updates the EDCA parameters of the corresponding access category based on the MU EDCA parameter set. More specifically, the STA updates AIFSN[AC], CWmin[AC] and CWmax [AC] values of all categories in which QoS data was successfully transmitted via the trigger-based PPDU 420 with the values specified in the MU EDCA parameter set. The STA uses the updated EDCA parameters to access the channel. More specifically, the STA newly sets a contention window based on the updated contention window minimum value and/or contention window maximum value and obtains a back off timer within the set contention window. The STA performs the backoff procedure using the obtained backoff timer.

According to a further embodiment of the present invention, the first condition and the second condition may include a case that the STA receives a trigger frame 410 indicating at least one random access resource unit from the AP and transmits the trigger-based PPDU 420 through a random access in response thereto. In addition, if the trigger-based PPDU 420 transmitted by the STA does not request an immediate acknowledgment, the third condition may be omitted. In this case, the STA may switch from the legacy EDCA mode 50a to the MU EDCA mode 60 when the first condition and the second condition are satisfied regardless of whether the immediate acknowledgment 430 is received or not.

According to an embodiment, the STA may switch to the MU EDCA mode 60 at the time when receiving the immediate acknowledgment 430 from the AP for the trigger-based PPDU 420. According to another embodiment, if the trigger-based PPDU 420 transmitted by the STA does not request an immediate acknowledgment, the STA may switch to the MU EDCA mode 60 at the time when the transmission of the trigger-based PPDU 420 is completed.

When the mode of the particular access category of the STA switches from the legacy EDCA mode 50a to the MU EDCA mode 60, the STA sets an MU EDCA timer for the corresponding access category (i.e., HEMUEDCATimer [AC]). The MU EDCA timer indicates a duration of performing channel access for the corresponding access category using parameters updated based on the MU EDCA parameter set. In this case, the MU EDCA timer may be maintained and managed for each access category. Also, the MU EDCA timer information may be included in the MU EDCA parameter set. The MU EDCA parameter set may represent the MU EDCA timer information via an MU EDCA timer subfield. The STA sets the MU EDCA timer with a value of the MU EDCA timer subfield of the MU EDCA parameter set most recently received from the AP to which the STA is associated.

The MU EDCA timer is decremented unless the STA succeeds in additional UL-MU transmission. When the MU EDCA timer reaches zero, the STA switches the mode of the corresponding access category from the MU EDCA mode 60 to the legacy EDCA mode 50b. By setting the MU EDCA timer as above, if additional UL-MU transmission is not successful for a certain duration of time after the MU EDCA parameter set is applied, the STA may return to the legacy EDCA mode 50b.

If the mode of the particular access category of the STA switches from the MU EDCA mode 60 to the legacy EDCA mode 50b (i.e., the MU EDCA timer of the particular access category reaches zero), the STA updates the EDCA parameters of the corresponding access category based on the legacy parameter set. According to an embodiment, the STA may update the EDCA parameters based on the legacy EDCA parameter set most recently received from the AP to which the STA is associated. If the legacy EDCA parameter set is not received from the AP to which the STA is associated, the STA updates the EDCA parameters based on the predetermined default EDCA parameter set. The STA uses the updated EDCA parameters to access the channel. More specifically, the STA newly sets a contention window based on the updated contention window minimum value and/or the contention window maximum value and obtains a back off timer within the set contention window. The STA performs the backoff procedure using the obtained backoff timer.

FIG. 8 illustrates a configuration of a multi-user EDCA parameter set element according to an embodiment of the present invention. More specifically, FIG. 8(a) illustrates the MU EDCA parameter set element, and FIG. 8(b) illustrates the abbreviated MU EDCA parameter set element. Further, FIG. 8(c) illustrates elements of the 'MU QoS Info' field included in the MU EDCA parameter set or the abbreviated MU EDCA parameter set.

Referring to FIG. 8(a), the MU EDCA parameter set element includes element identifier fields, that is, an 'Element ID' field and an 'Element ID Extension' field. In addition, the MU EDCA parameter set element also includes a plurality of 'MU AC Parameter Record' fields that represent the EDCA parameters of each access category. More specifically, the MU EDCA parameter set element includes a 'MU AC_BE Parameter Record' field, a 'MU AC BK Parameter Record' field, a 'MU AC_VI Parameter Record' field, and a 'MU AC VO Parameter Record' field. Each 'MU AC Parameter Record' field may indicate the EDCA parameters of the corresponding access category, that is, AIFSN, CWmin and CWmax values. Further, the MU EDCA parameter set element may also include MU EDCA timer information for each access category.

The MU EDCA parameter set element may be transmitted via a probe response and/or an association response in a step that the STA initially establishes a link with the AP. In addition, the MU EDCA parameter set element may be transmitted via a beacon frame while the AP is operating the MU EDCA parameters in the BSS. The STA receiving the MU EDCA parameter set element may update the EDCA parameters of each access category based on the values of the 'MU AC Parameter Record' field in the MU EDCA mode.

Meanwhile, the MU EDCA parameter set element includes an 'MU QoS Info' field. Referring to FIG. 8(c), the 'MU QoS Info' field includes an 'MU EDCA Parameter Set Update Count' subfield (hereinafter, an update count subfield). The update count subfield is initially set to zero and is incremented each time the MU EDCA parameter is changed. Accordingly, the update count subfield indicates information on how many times the MU EDCA parameter has been changed.

The AP may increment the update count subfield value by 1 when changing the MU EDCA parameter set. The STA which has received the MU EDCA parameter set from the AP may determine whether to change the MU EDCA parameter set based on the value of the update count subfield. Meanwhile, the format of the subfields of the 'MU QoS Info' field other than the update count subfield may be the same as the format of the corresponding subfields of the existing 'QoS Info' field.

FIG. 8(b) illustrates an abbreviated MU EDCA parameter set element according to a further embodiment of the invention. If the value of the update count subfield of the MU EDCA parameter set received via the beacon frame or the like has not been changed from the update count subfield value previously obtained by the STA, the STA may not check the following 'MU AC Parameter Record' field. Thus, it may be inefficient to transmit the 'MU AC Parameter Record' field for every beacon frame if the value of the update count subfield has not been changed. Therefore, as shown in FIG. 8(b), an MU EDCA parameter set in which the 'MU AC Parameter Record' field is omitted, that is, an abbreviated MU EDCA parameter set may be used. The AP may selectively transmit the MU EDCA parameter set or the abbreviated MU EDCA parameter set based on whether or not the value of the update count subfield is changed.

Figure 9:
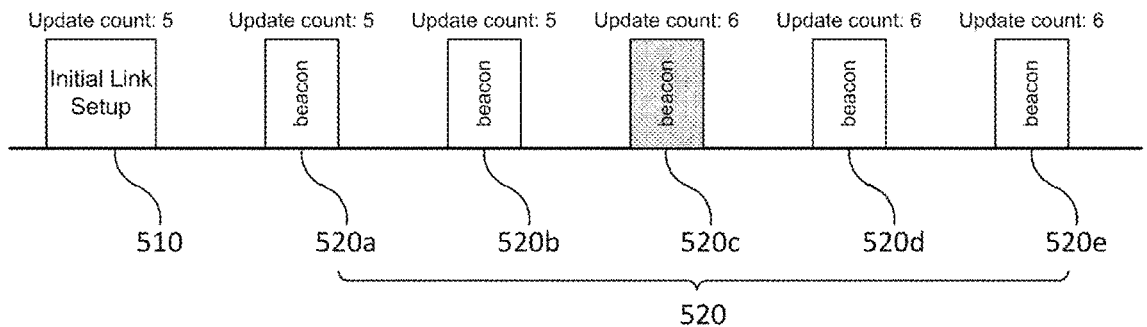
FIG. 9 illustrates a method of transmitting a multi-user EDCA parameter set according to an embodiment of the present invention.

FIG. 9 illustrates a method of transmitting a multi-user EDCA parameter set according to an embodiment of the present invention. Referring to FIG. 9, an AP may transmit an MU EDCA parameter set through an initial link setup frame 510. In this case, the initial link setup frame 510 includes at least one of a probe response and an association response. In addition, the AP may transmit the MU EDCA parameter set through periodically transmitted beacon frames 520.

According to the embodiment of FIG. 9, the value of the update count subfield in the initial link setup frame 510 and beacon frames 520a, 520b is set to 5. However, the MU EDCA parameter set is changed after transmission of the beacon frame 520b and the AP increments the value of the update count subfield by 1. Thus, the value of the update count subfield in beacon frames 520c, 520d, and 520e is set to 6.

According to an embodiment of the present invention, if the value of the update count subfield is not changed from the previous value, the AP may transmit the abbreviated MU EDCA parameter set via the beacon frames 520a, 520b, 520d and 520e. The AP may transmit the MU EDCA parameter set through the beacon frame 520c only if the value of the update count subfield has changed from the previous value. If it is identified in the received beacon frame 520c that the value of the update count subfield has been changed from the previously obtained update count subfield value, the STA may check the 'MU AC Parameter Record' field to obtain the MU EDCA parameters.

According to another embodiment of the present invention, the AP may transmit the abbreviated MU EDCA parameter set for each beacon frame 520a, 520b, 520c, 520d, and 520e. If it is identified in the received beacon frame 520c that the value of the update count subfield is changed from the previously obtained update count subfield value, the STA may transmit a probe request frame or the like to request the AP to transmit the MU EDCA parameter set.

When switching to the MU EDCA mode, the STA updates the EDCA parameters based on the MU EDCA parameter set. In this case, the STA may update the EDCA parameters based on the MU EDCA parameter set most recently received from the AP to which the STA is associated. If the MU EDCA parameter set is not received from the AP to which the STA is associated, the STA may update the EDCA parameters based on the predetermined default MU EDCA parameter set. If the default MU EDCA parameter set is not present, the STA may update the EDCA parameters based on the legacy EDCA parameter set even in the MU EDCA mode.

Meanwhile, according to the embodiment of the present invention, the MU EDCA parameter set may be selectively used. The AP and/or STA may enable or disable the application of the MU EDCA parameter set. Hereinafter, a method of selectively using the MU EDCA parameter set according to embodiments of the present invention will be described with reference to FIGS. 10 to 14.

Figure 10:
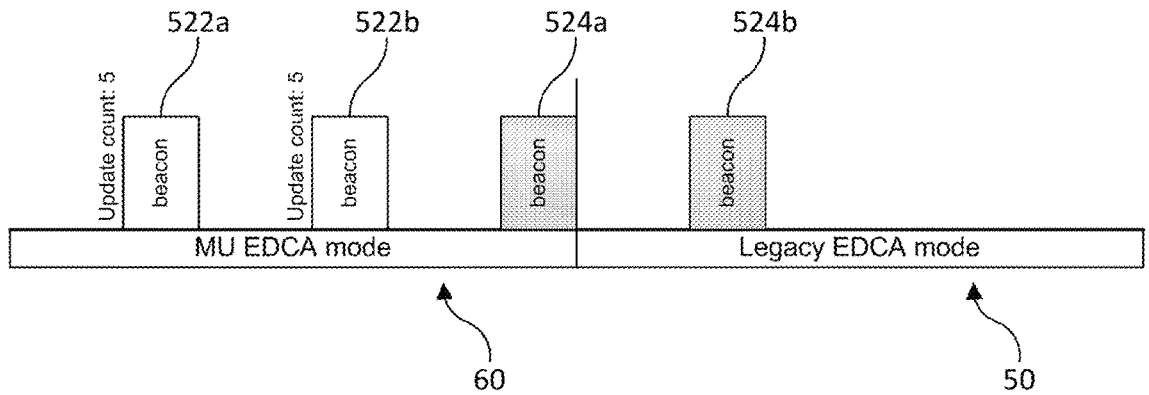
FIG. 10 illustrates a method of disabling a multi-user EDCA according to an embodiment of the present invention.

FIG. 10 illustrates a method of disabling a multi-user EDCA according to an embodiment of the present invention. According to an embodiment of the present invention, the AP may determine whether to enable the MU EDCA. In this case, the AP may disable the MU EDCA by not including the MU EDCA parameter set element in the periodically transmitted beacon frame. In the embodiment of FIG. 10, beacon frames 522a and 522b include MU EDCA parameter set element, and beacon frames 524a and 524b do not include MU EDCA parameter set element.

If the MU EDCA parameter set element is not extracted from the received beacon frame 524a, the STA may switch the access category in the MU EDCA mode 60 to the legacy EDCA mode 50. In this case, the STA updates the EDCA parameters based on the legacy EDCA parameter set. More specifically, the STA may perform at least one of the following operations.

A-1) The STA updates the AIFSN[AC], CWmin[AC] and CWmax[AC] values of all access categories operating in the MU EDCA mode 60 to the values contained in the legacy EDCA parameter set. More specifically, the STA may update the EDCA parameters of all access categories having non-zero MU EDCA timers to the values contained in the legacy EDCA parameter set most recently received from the AP to which the STA is associated. If the legacy EDCA parameter set has not been received from the AP to which the STA is associated, the STA updates the EDCA parameters of all access categories having non-zero MU EDCA timers to the values contained in a predetermined default EDCA parameter set. That is, the STA updates the EDCA parameters to the values contained in the legacy EDCA parameter set most recently received from the AP to which the STA is associated, or to the values contained in the predetermined default EDCA parameter set. On the other hand, no special operation is required for the access category that is already operating in the legacy EDCA mode 50.

A-2) The STA sets the MU EDCA timer of all access categories operating in the MU EDCA mode 60 to zero and updates the AIFSN[AC], CWmin[AC] and CWmax[AC] values of the corresponding access category to the values contained in the legacy EDCA parameter set. The specific method for updating the EDCA parameters of the STA to the values contained in the legacy EDCA parameter set is as described in A-1). Since the MU EDCA timer is designed to be decremented without suspension, the MU EDCA timer may continue to decrease even after switching to the legacy EDCA mode 50 if it is not set to zero. If the MU EDCA timer reaches zero thereafter, an unnecessary management information base (MIB) update may be performed even though the corresponding access category has already been switched to the legacy EDCA mode 50. Thus, the STA sets the MU EDCA timer of all access categories to zero.

A-3) The STA sets the MU EDCA timer of all access categories operating in the MU EDCA mode 60 to zero and updates the AIFSN[AC], CWmin[AC] and CWmax[AC] values of the corresponding access category to the value contained in the legacy EDCA parameter set. In addition, the STA newly sets the contention window based on the updated CWmin[AC] and/or CWmax[AC], and obtains the backoff timer within the set contention window. As described above, according to an embodiment of the present invention, at least one parameter of the MU EDCA parameter set may be set to a value greater than a corresponding parameter of the legacy EDCA parameter set. In this case, when the channel access in the legacy EDCA mode 50 is performed using the contention window and the backoff timer set in the MU EDCA mode 60, channel access of the STA may be restricted. Thus, the STA resets the contention window and backoff timer of the access category which is switched to the legacy EDCA mode 50. According to an embodiment, the STA may initialize the contention window and backoff timer based on the legacy EDCA parameters. According to another embodiment, the STA may reset the contention window and backoff timer based on the ratio between CWmin[AC] and CWmax[AC] of the legacy EDCA parameter set and CWmin[AC] and CWmax[AC] of the MU EDCA parameter set.

According to a further embodiment of the present invention, the abbreviated MU EDCA parameter set described above in FIG. 8 may be used. In this case, the STA may perform any one of the operations A-1) to A-3) when the abbreviated MU EDCA parameter set element in addition to the MU EDCA parameter set element are not extracted from the received beacon frame. If at least one of the MU EDCA parameter set element and the abbreviated MU EDCA parameter set element is extracted from the received beacon frame, the STA does not perform the above operation since the AP permits the use of the MU EDCA parameters.

Figure 11:
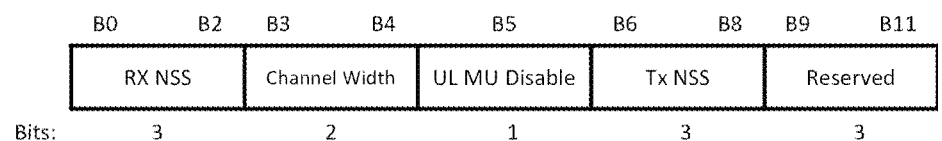
FIG. 11 illustrates a configuration of an operating mode indication element according to an embodiment of the present invention.

FIG. 11 illustrates a configuration of an operating mode indication element according to an embodiment of the present invention. The non-legacy STA may change its transmit/receive parameters and inform this change information through transmission of a separate element. According to an embodiment, the STA may change its operating mode setting using the operating mode indication (OMI) element shown in FIG. 11.

The OMI information (alternatively, OMI element, OMI control field) may be contained as a high efficiency (HE) variant of the HT control field of the MAC header in a frame transmitted by the non-legacy terminal. A terminal transmitting a frame containing OMI information is defined as an OMI initiator, and a terminal receiving a frame containing OMI information is defined as an OMI responder. The OMI initiator that has transmitted a frame containing OMI information can change its transmit/receive parameters when receiving an immediate acknowledgment from the OMI responder.

Referring to FIG. 11, the OMI element includes a UL-MU disable subfield. The UL-MU disable subfield indicates whether or not the corresponding STA participates in the UL-MU transmission. More specifically, when the UL-MU disable subfield is set to zero, it indicates that the STA participates in the UL-MU transmission. According to an embodiment, the UL-MU transmission of the STA may be a transmission of a trigger-based PPDU. The transmission of the trigger-based PPDU may be performed based on a number of space-time streams of the STA in a resource unit assigned within the operating channel width of the STA. In this case, the operating channel width of the STA is indicated by a channel width subfield of the OMI element, and the number of space-time streams of the STA is determined within the value indicated by a transmission NSTS (i.e., Tx NSTS) subfield of the OMI element. On the other hand, when the UL-MU disable subfield is set to 1, it indicates that the UL-MU operation of the STA is suspended. In this case, the STA does not participate in the UL-MU transmission until the frame containing the OMI information in which the UL-MU disable subfield is set to zero is transmitted.

Figure 12:
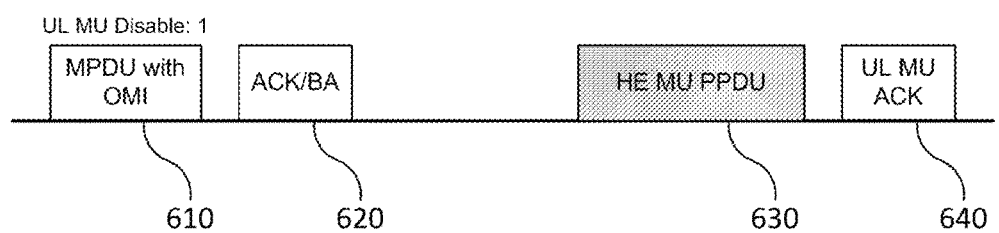
FIG. 12 illustrates a method of controlling multi-user transmission according to operating mode indication information.

FIG. 12 illustrates a method of controlling multi-user transmission according to operating mode indication information. In the embodiment of FIG. 12, the OMI initiator transmits a frame 610 containing OMI information and receives an immediate acknowledgment 620 thereto from the OMI responder. In this case, the UL-MU disable subfield of the OMI information contained in the frame 610 indicates the suspension of the UL-MU operation. That is, the UL-MU disable subfield is set to 1. Here, the OMI initiator is a non-AP STA and the OMI responder is an AP.

According to an embodiment of the present invention, the OMI responder AP considers that the OMI initiator STA that has transmitted the frame 610 containing the OMI information with the UL-MU disable subfield set to 1 will not respond to any kind of trigger frame. Thus, the AP may not schedule the OMI initiator STA for UL-MU transmission. In addition, the OMI initiator STA may not be possible to transmit an immediate acknowledgment 640 in the form of UL-MU when a MAC protocol data unit (MPDU) addressed to the STA in an HE MU PPDU 630 transmitted by the AP is a MAC management protocol data unit (MMPDU) or an MPDU in which an 'ACK policy' subfield of a 'QoS control' subfield is set to MU ACK. Accordingly, when the OMI responder AP performs a DL-MU transmission to the OMI initiator STA using the HE MU PPDU 630, the OMI Responder AP may not aggregate an MPDU requesting an immediate acknowledgment 640 in the form of UL-MU to the A-MPDU transmitted to the corresponding STA. In this case, the MPDU requesting an immediate acknowledgment 640 in the form of UL-MU includes an action frame, a trigger frame, an MPDU containing an UL-MU response scheduling, an MPDU in which the 'ACK policy' subfield of the 'QoS control' field is set to MU ACK, and the like.

Figure 13:
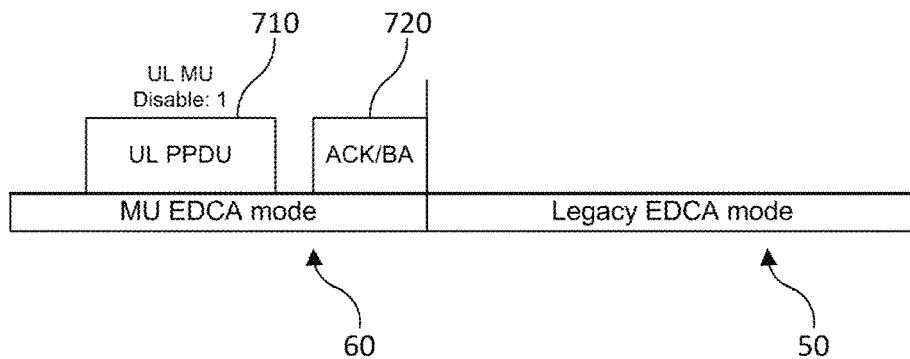
FIG. 13 illustrates a method for disabling a multi-user EDCA according to another embodiment of the present invention.

FIG. 13 illustrates a method for disabling a multi-user EDCA according to another embodiment of the present invention. In addition to the case where the AP does not allow the use of the MU EDCA parameter set, the STA can immediately suspend the use of the MU EDCA parameter set at a particular point in time. The STA may suspend the use of the MU EDCA parameter set by transmitting a frame containing the OMI element with the UL-MU disable subfield set to 1, as described above with reference to FIG. 11.

Referring to FIG. 13, the OMI initiator STA transmits a frame 710 containing OMI information with the UL-MU disable subfield set to 1 and receives an immediate acknowledgment 720 from the OMI responder. As such, when the frame 710 containing OMI information in which the UL-MU disable subfield indicates the suspension of the UL-MU operation is transmitted an immediate acknowledgment 720 from the OMI responder for the frame 710 containing the OMI is received, the STA may switch the access category in the MU EDCA mode 60 to the legacy EDCA mode 50. In this case, the STA updates the EDCA parameters based on the legacy EDCA parameter set. More specifically, the STA may perform at least one of the following operations.

B-1) The STA updates the AIFSN[AC], CWmin[AC], and CWmax[AC] values of all access categories operating in the MU EDCA mode 60 to the values contained in the legacy EDCA parameter set. More specifically, the STA may update the EDCA parameters of all access categories having non-zero MU EDCA timers to the values contained in the legacy EDCA parameter set most recently received from the AP to which the STA is associated. If the legacy EDCA parameter set has not been received from the AP to which the STA is associated, the STA updates the EDCA parameters of all access categories having non-zero MU EDCA timers to the values contained in a predetermined default EDCA parameter set. That is, the STA updates the EDCA parameters to the values contained in the legacy EDCA parameter set most recently received from the AP to which the STA is associated, or to the values contained in the predetermined default EDCA parameter set.

B-2) The STA sets the MU EDCA timer of all access categories operating in the MU EDCA mode 60 to zero and updates the AIFSN[AC], CWmin[AC] and CWmax[AC] values of the corresponding access category to the values contained in the legacy EDCA parameter set. The specific method for updating the EDCA parameters of the STA to the values contained in the legacy EDCA parameter set is as described in B-1). Since the MU EDCA timer is designed to be decremented without suspension, the MU EDCA timer may continue to decrease even after switching to the legacy EDCA mode 50 if it is not set to zero. If the MU EDCA timer reaches zero thereafter, an unnecessary management information base (MIB) update may be performed even though the corresponding access category has already been switched to the legacy EDCA mode 50. Thus, the STA sets the MU EDCA timer of all access categories to zero.

B-3) The STA sets the MU EDCA timer of all access categories operating in the MU EDCA mode 60 to zero and updates the AIFSN[AC], CWmin[AC] and CWmax[AC] values of the corresponding access category to the value contained in the legacy EDCA parameter set. In addition, the STA newly sets the contention window based on the updated CWmin[AC] and/or CWmax[AC], and obtains the backoff timer within the set contention window. As described above, according to an embodiment of the present invention, at least one parameter of the MU EDCA parameter set may be set to a value larger than a corresponding parameter of the legacy EDCA parameter set. In this case, when the channel access in the legacy EDCA mode 50 is performed using the contention window and the backoff timer set in the MU EDCA mode 60, channel access of the STA may be restricted. Thus, the STA resets the contention window and backoff timer of the access category which is switched to the legacy EDCA mode 50. According to an embodiment, the STA may initialize the contention window and backoff timer based on the legacy EDCA parameters. According to another embodiment, the STA may reset the contention window and backoff timer based on the ratio between CWmin[AC] and CWmax[AC] of the legacy EDCA parameter set and CWmin[AC] and CWmax[AC] of the MU EDCA parameter set.

Figure 14:
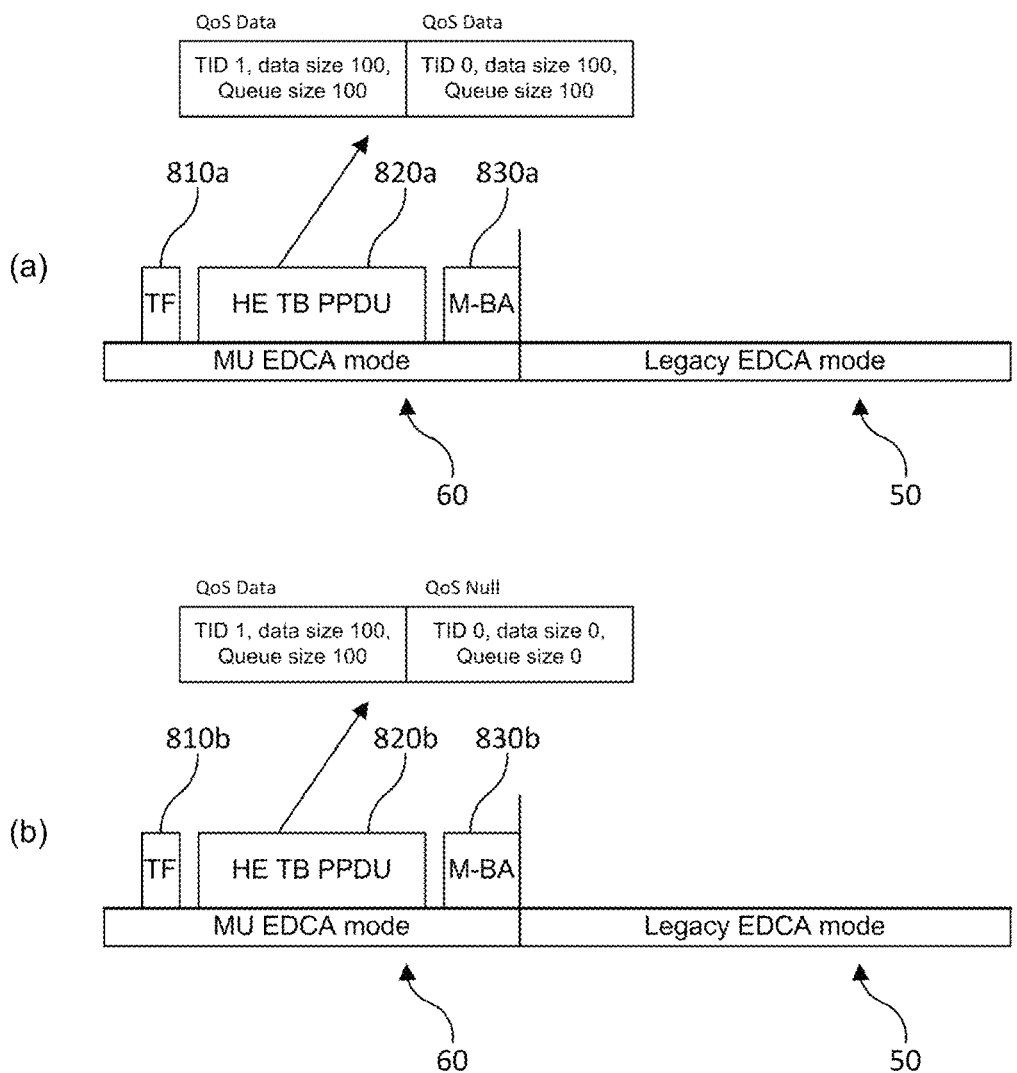
FIG. 14 illustrates a method for disabling a multi-user EDCA according to yet another embodiment of the present invention.

FIG. 14 illustrates a method for disabling a multi-user EDCA according to yet another embodiment of the present invention. The STA may inform the AP that no more data is present in a particular access category to receive UL-MU scheduling. According to an embodiment, the STA may transmit a buffer status report through uplink to deliver the size information of the remaining data of the particular access category to the AP.

Referring to FIG. 14, the STA may indicate the size of data remaining in a buffer of the corresponding TID, including data currently being transmitted, through the 'Queue Size' subfield of the 'QoS Control' field of the MAC header in the trigger-based PPDUs 820*a* and 820*b* transmitted in response to the trigger frames 810*a* and 820*b*. As shown in FIG. 14(*a*), the STA may indicate the size of data remaining in the buffer of each TID (i.e., TID 1, TID 0) through the 'Queue Size' subfield of the corresponding frame. In addition, as shown in FIG. 14(*b*), the STA may indicate the size of data remaining in the buffer of a particular TID for which no data is transmitted through the 'Queue Size' subfield of a QoS Null frame.

The AP may indicate that all data transmissions are successful through the responses 830*a* and 830*b* to the PPDUs 820*a* and 820*b* transmitted by the STA. If the size of data indicated by the 'Queue Size' subfield is the same as the size of transmitted data of the corresponding TID as in the embodiment shown in FIG. 14, no data to be transmitted is remaining in the buffer of the corresponding TID. In this case, both the AP and the STA may identify that the size of data remaining in the buffer of the corresponding TID is 0. As in the embodiment of FIG. 14, if the buffer sizes of 'TID 0' and 'TID 1' are all 0, there is no data remaining in a queue of 'access category 0'. In this manner, when both the AP and the STA identify that the buffer size of all the TIDs belonging to a particular access category is 0 at the time the STA completes a UL transmission, the STA may switch the mode of the corresponding access category from the MU EDCA mode 60 to the legacy EDCA mode 50. In this case, the STA updates the EDCA parameters of the corresponding access category based on the legacy EDCA parameter set. More specifically, the STA may perform at least one of the following operations.

C-1) The STA updates the AIFSN[AC], CWmin[AC] and CWmax[AC] values of the corresponding access category to the values contained in the legacy EDCA parameter set. More specifically, the STA may update the EDCA parameters of the corresponding access category to the values contained in the legacy EDCA parameter set most recently received from the AP to which the STA is associated. If the legacy EDCA parameter set has not been received from the AP to which the STA is associated, the STA updates the EDCA parameters of the corresponding access category to the values contained in a predetermined default EDCA parameter set. That is, the STA updates the EDCA parameters to the values contained in the legacy EDCA parameter set most recently received from the AP to which the STA is associated, or to the values contained in the predetermined default EDCA parameter set.

C-2) The STA sets the MU EDCA timer of the corresponding access category to zero and updates the AIFSN[AC], CWmin[AC] and CWmax[AC] values of the corresponding access category to the values contained in the legacy EDCA parameter set. The specific method for updating the EDCA parameters of the STA to the values contained in the legacy EDCA parameter set is as described in C-1).

C-3) The STA sets the MU EDCA timer of the corresponding access category operating in the MU EDCA mode 60 to zero and updates the AIFSN[AC], CWmin[AC] and CWmax[AC] values of the corresponding access category to the values contained in the legacy EDCA parameter set. In addition, the STA newly sets the contention window of the corresponding access category based on the updated CWmin[AC] and/or CWmax[AC], and obtains the backoff timer within the set contention window. The specific methods by which the STA obtains the contention window and the backoff timer are as described in A-3) and B-3).

HE MU PPDU Configuration Method

Figure 15:
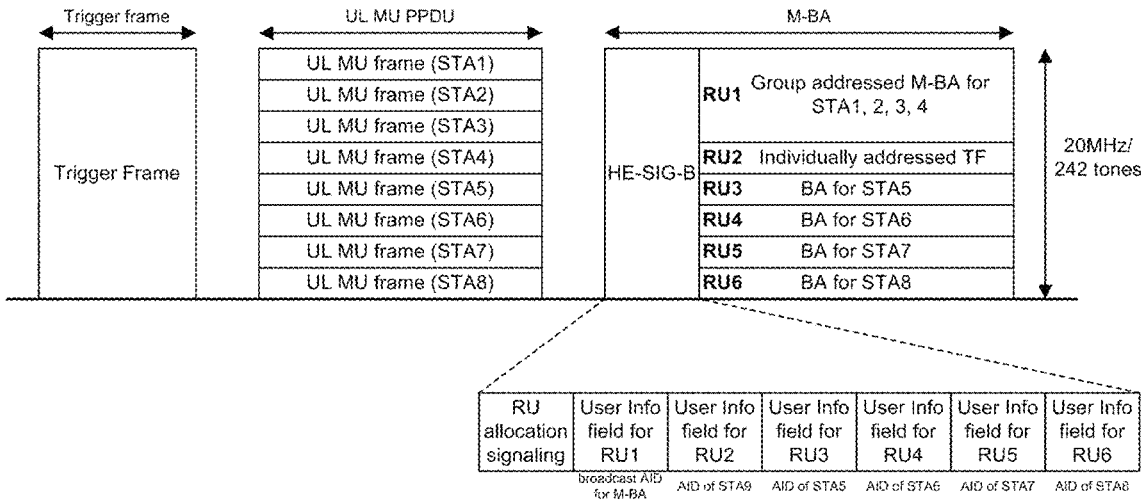
FIG. 15 illustrates a configuration of an HE MU PPDU according to an embodiment of the present invention.
Figure 16:
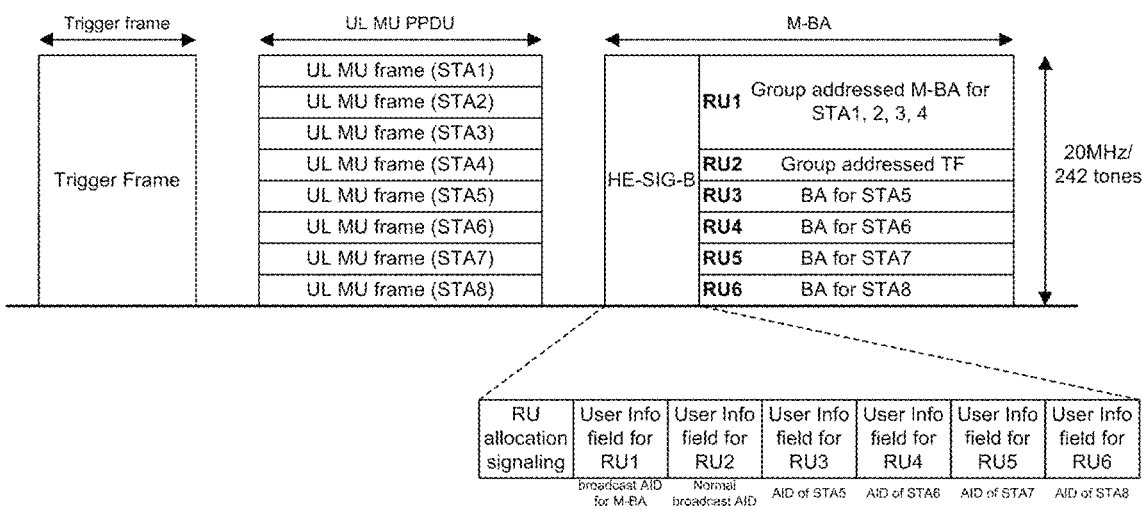
FIG. 16 illustrates a configuration of an HE MU PPDU according to another embodiment of the present invention.
Figure 17:
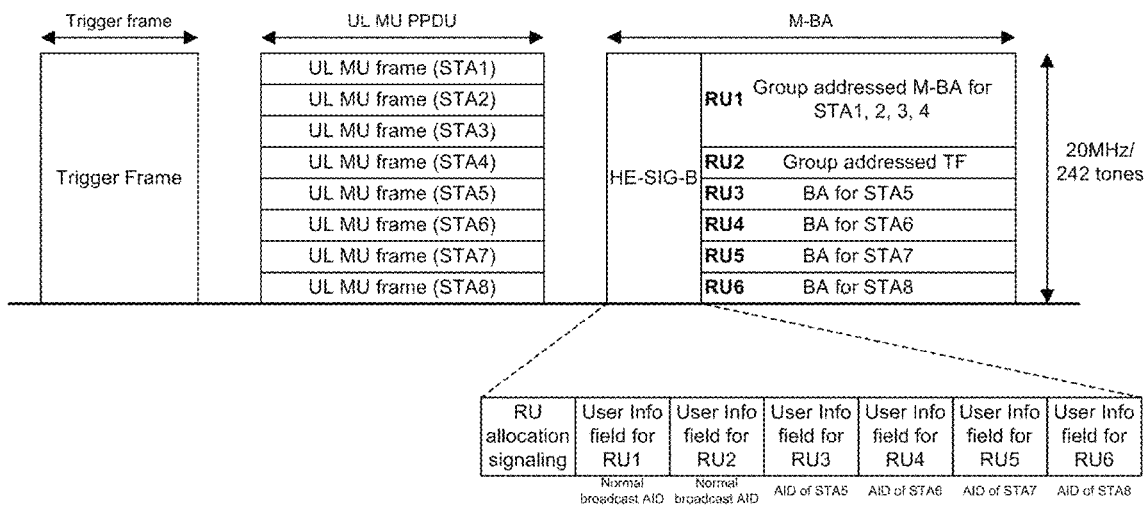
FIG. 17 illustrates a configuration of an HE MU PPDU according to yet another embodiment of the present invention.

FIGS. 15 to 17 illustrate methods of configuring an HE MU PPDU according to embodiments of the present invention. In the embodiments of FIGS. 15 to 17, a plurality of STAs perform UL-MU transmission in response to the trigger frame of the AP. In addition, an M-BA is received in response to the UL-MU transmission. In this case, the M-BA is transmitted in the form of HE MU PPDU. In the embodiments of FIGS. 15 to 17, RU1, RU2, RU3, RU4, RU5 and RU6 indicate each resource unit constituting the HE MU PPDU.

FIG. 15 illustrates a configuration of an HE MU PPDU according to an embodiment of the present invention. In the non-legacy wireless LAN system, if the trigger-based PPDU transmitted in UL-MU requests an immediate acknowledgment, the AP may transmit a block acknowledgment (BA) in the form of HE MU PPDU to a plurality of STAs. In addition, the M-BA used in the non-legacy wireless LAN system may contain ACK information for a plurality of STAs in a single MAC frame. Therefore, a group addressed M-BA and an individually addressed M-BA may be mixed in one HE MU PPDU.

The HE MU PPDU may indicate, through a user information field of HE-SIG-B, the recipient AID corresponding to each resource unit on which transmission is performed. In this case, a broadcast AID is inserted into a user information field corresponding to a resource unit (i.e., RU1) to which the group addressed M-BA is allocated, an AID of each recipient STA is inserted into user information fields corresponding to resource units (i.e., RU2 to RU6) to which the individually addressed M-BA is allocated. However, when a plurality of different group addressed M-BAs are transmitted through one HE MU PPDU, a plurality of broadcast AIDs corresponding to different resource units may be inserted into the user information field of the HE-SIG-B. If an AID of a STA participating in the UL-MU transmission is not present in the HE-SIG-B of the HE MU PPDU, the corresponding STA may not identify which resource unit among the plurality of resource units corresponding to the plurality of broadcast AIDs contains its ACK information.

Thus, according to an embodiment of the present invention, when a plurality of different M-BAs are transmitted through one HE MU PPDU, a restriction that only one or less group addressed M-BA should present in the HE MU PPDU can be applied. In addition, the AP should transmit the corresponding M-BA on a 20 MHz channel which includes resource units in which the UL-MU transmission participating STAs that are the targets of each M-BA have transmitted the trigger-based PPDUs.

FIG. 16 illustrates a configuration of an HE MU PPDU according to another embodiment of the present invention. According to the aforementioned embodiment, when the group addressed M-BA is transmitted through the particular resource unit (i.e., RU1) of the HE MU PPDU, it may be impossible to transmit a group addressed A-MPDU through another resource unit. However, when an MU cascading sequence defined in the non-legacy wireless LAN system is performed, the transmission efficiency may be increased if a group addressed trigger frame is transmitted through another resource unit (e.g., RU2).

Thus, according to the embodiment of FIG. 16, a separate broadcast AID for the group addressed M-BA may be specified. A general broadcast AID may be used for a group addressed A-MPDU other than the M-BA. STAs receiving an HE MU PPDU in the non-legacy wireless LAN system cannot receive A-MPDU that is targeted to themselves in a plurality of resource units. Therefore, a STA that needs to receive an ACK from the HE MU PPDU may receive ACK information through a resource unit (i.e., RU1) to which a separate broadcast AID is assigned. On the other hand, a STA that is not scheduled to receive an ACK from the HE MU PPDU may receive data through a resource unit corresponding to its AID, or may receive group addressed through trigger frame through a resource unit (i.e., RU2) corresponding to the broadcast AID.

FIG. 17 illustrates a configuration of an HE MU PPDU according to yet another embodiment of the present invention. According to the embodiment of FIG. 17, a plurality of broadcast AIDs may be inserted into the user information field of the HE-SIG-B of the HE MU PPDU. In this case, an index order of a resource unit allocation may be used to distinguish the group addressed M-BA and the group addressed A-MPDU other than the M-BA within one HE MU PPDU. The resource unit allocation field of the HE-SIG-B of the HE MU PPDU indicates division and arrangement information of resource units through predetermined indices. In addition, the user information field of the HE-SIG-B indicates the AID value of each resource unit in the order according to the arrangement of resource units indicated by the resource unit allocation field.

According to an embodiment of the present invention, when two broadcast AIDs are represented by the user information field of the HE-SIG-B of the HE MU PPDU, the group addressed targets may be implicitly designated according to the represented order of the respective broadcast AIDs. According to an embodiment, the first represented broadcast AID may indicate a resource unit for a group addressed M-BA, and the next represented broadcast AID may indicate a resource for a group addressed A-MPDU other than the M-BA. According to another embodiment, an implicit designation may be performed in the reverse order. If the two broadcast AIDs are assigned to different 20 MHz channels, the implicit designation may be performed based on the order of the channel bonding rules of the wireless LAN system.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
a communication unit; and
a processor configured to control transmission and reception of a wireless signal through the communication unit,
wherein the processor is configured to:
receive a first frame including at least one of a first enhanced distributed channel access(EDCA) parameter set and a second EDCA parameter set,
transmit a second frame related to a specific operation of the terminal,
wherein the second frame includes an operation mode subfield including a disable subfield indicating whether the terminal participates in the specific operation, and
perform a channel access based on updated EDCA parameters according to a parameter set selected among the first EDCA parameter set or the second EDCA parameter set,
wherein the EDCA parameters are updated based on the first EDCA parameter set based on whether the disable subfield indicates participation in the specific operation and whether an immediate response of the second frame is received according to whether the disable subfield indicates participation in the specific operation.

2. The wireless communication terminal of claim 1,
wherein the EDCA parameters are updated based on the first EDCA parameter set after the immediate response of the second frame is received when the disable subfield indicates that the terminal does not participate in the specific operation.

3. The wireless communication terminal of claim 1,
wherein the second EDCA parameter set includes first timer subfields indicating a timer value indicating a duration for performing the channel access for each of access categories.

4. The wireless communication terminal of claim 3,
wherein each of EDCA timers corresponding to each of the access categories of the terminal is updated based on each of the first timer subfields when the EDCA parameters are updated based on the second EDCA parameter set.

5. The wireless communication terminal of claim 4,
wherein each of the EDCA timers for each of the access categories is set to '0' when the immediate response to the second frame is received.

6. The wireless communication terminal of claim 4,
wherein the EDCA parameters are updated based on the first EDCA parameter set most recently received from a base wireless communication terminal associated with the terminal when each of the EDCA timers reaches '0'.

7. A wireless communication method of a wireless communication terminal, the method comprising:
receiving a first frame including at least one of a first enhanced distributed channel access(EDCA) parameter set and a second EDCA parameter set;
transmitting a second frame related to a specific operation of the terminal,
wherein the second frame includes an operation mode subfield including a disable subfield indicating whether the terminal participates in the specific operation; and
performing a channel access based on updated EDCA parameters according to a parameter set selected among the first EDCA parameter set or the second EDCA parameter set,
wherein the EDCA parameters are updated based on the first EDCA parameter set based on whether the disable subfield indicates participation in the specific operation and whether an immediate response of the second frame is received according to whether the disable subfield indicates participation in the specific operation.

8. The wireless communication method of claim 7,
wherein the EDCA parameters are updated based on the first EDCA parameter set after the immediate response of the second frame is received when the disable subfield indicates that the terminal does not participate in the specific operation.

9. The wireless communication method of claim 7,
Wherein the second EDCA parameter set includes first timer subfields indicating a timer value indicating a duration for performing the channel access for each of access categories.

10. The wireless communication method of claim 9,
wherein each of EDCA timers corresponding to each of the access categories of the terminal is updated based on each of the first timer subfields when the EDCA parameters are updated based on the second EDCA parameter set.

11. The wireless communication method of claim 10,
wherein each of the EDCA timers for each of the access categories is set to '0' when hen the immediate response to the second frame is received.

12. The wireless communication method of claim 10,
wherein the EDCA parameters are updated based on the first EDCA parameter set most recently received from a base wireless communication terminal associated with the terminal when each of the EDCA timers reaches '0'.

* * * * *